(12) United States Patent
Utsunomiya

(10) Patent No.: US 7,136,180 B2
(45) Date of Patent: Nov. 14, 2006

(54) METHOD AND APPARATUS FOR EMAIL-BASED PRINTER

(75) Inventor: Takeshi Utsunomiya, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 900 days.

(21) Appl. No.: 09/998,230

(22) Filed: Dec. 3, 2001

(65) Prior Publication Data

US 2002/0097414 A1    Jul. 25, 2002

(30) Foreign Application Priority Data

Dec. 5, 2000  (JP) .............................. 2000-370455
Oct. 31, 2001 (JP) .............................. 2001-334790

(51) Int. Cl.
G06F 15/00 (2006.01)
G06F 15/16 (2006.01)
H04N 1/00 (2006.01)

(52) U.S. Cl. ....................... 358/1.15; 358/1.2; 358/206; 358/402; 358/403; 709/206; 713/152

(58) Field of Classification Search ............... 358/1.15, 358/402, 403, 1.2, 1.9; 709/223, 206; 713/152
See application file for complete search history.

(56) References Cited

U.S. PATENT DOCUMENTS 6,295,423 B1 * 9/2001 Haines et al. .................. 399/24
6,509,974 B1 * 1/2003 Hansen ........................ 358/1.12
6,590,675 B1 * 7/2003 Tomiyasu ................... 358/1.18
6,697,942 B1 * 2/2004 L'Heureux et al. ......... 713/152
6,792,577 B1 * 9/2004 Kimoto ....................... 715/522
2002/0143924 A1 * 10/2002 Iga .............................. 709/223

FOREIGN PATENT DOCUMENTS

| JP | 96-077994   | 3/1994  |
|----|-------------|---------|
| JP | 6-320845    | 11/1994 |
| JP | 7-175603    | 7/1995  |
| JP | 7-297826    | 11/1995 |
| JP | 11-031112   | 2/1999  |
| JP | 11-212891   | 8/1999  |
| JP | 11-353262   | 12/1999 |
| JP | 2000-029648 | 1/2000  |
| JP | 2000-066972 | 3/2000  |
| JP | 2000-242444 | 9/2000  |

* cited by examiner

Primary Examiner—Douglas Q. Tran
Assistant Examiner—Chan S. Park
(74) Attorney, Agent, or Firm—Fitzpatrick, Cella, Harper & Scinto

(57) ABSTRACT

A printer, which can perform printing in a mode desired by an outside user utilizing an electronic mail, has a mode of printing set based on a command included within a received electronic mail, and the received electronic mail is printed in the set mode of printing.

15 Claims, 15 Drawing Sheets

| COMMAND | DESCRIPTION |
|---|---|
| "PASSWORD" | DESCRIBE PASSWORD AFTER COMMAND. RECOGNIZE PORTION BEFORE LINE FEED AS PASSWORD. WHEN PASSWORD IS REGISTERED IN PRINTER, MAIL IS NOT ANALYZED UNLESS TWO PASSWORDS COINCIDE. |
| "PRINT-FILE" | PRINT ATTACHED FILE. DESCRIBE NAME AND DATA FORM OF FILE AFTER COMMAND. |
| "SET" | SET VARIOUS PRINTING-SETTING PARAMETERS. DESCRIBE NAMES OF SETTING ITEMS AND SETTING VALUES AFTER COMMAND. |
| "GET" | ACQUIRE VARIOUS PRINTING-SETTING PARAMETERS, LOG INFORMATION, EXPENDABLE-ITEM INFORMATION, AND THE LIKE. DESCRIBE INFORMATION NAME AFTER COMMAND. MAIL IS TRANSMITTED UPON PROVISION OF COMMAND. |

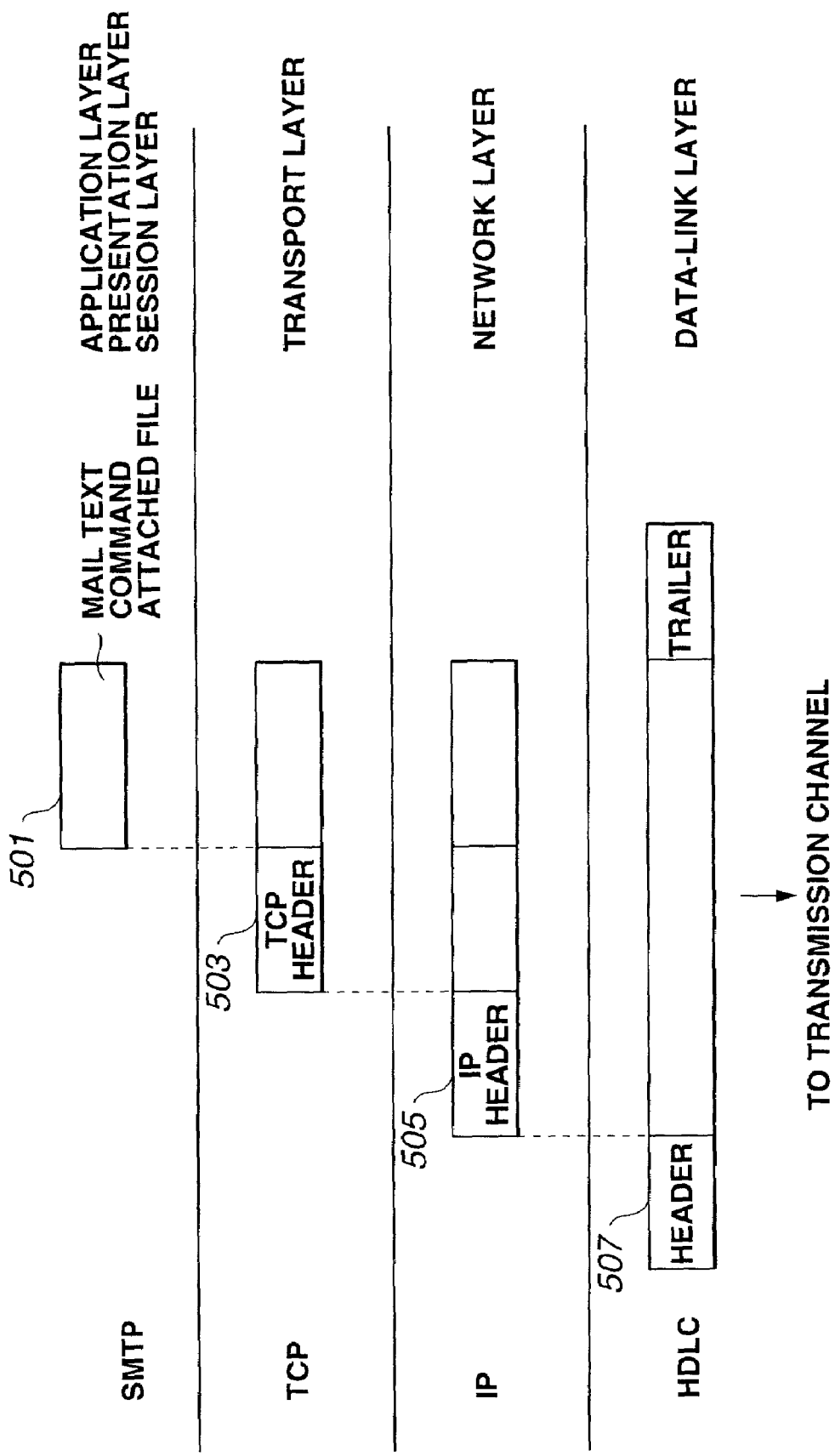

| ATTRIBUTE NAME | DESCRIPTION | EFFECTIVE RANGE | SETTING VALUE |
|---|---|---|---|
| NAME | NAME OF PRINTER | SETTING EFFECTIVE FOR PRINTER | CHARACTER STRING OF 16 ALPHANUMERIC CHARACTERS |
| SLEEPTIME | WAITING TIME UNTIL ENTERING SLEEP MODE (MIN) | SETTING EFFECTIVE FOR PRINTER | "OFF" 1~60 |
| LANGUAGE | LANGUAGE DISPLAYED ON PANEL | SETTING EFFECTIVE FOR PRINTER | "JP" "EN" |
| COPY | SETTING OF NUMBER OF COPIES | SETTING EFFECTIVE FOR ATTACHED PRINTING DATA | 1~999 |
| DUPLEX | SETTING OF DUPLEX PRINTING | SETTING EFFECTIVE FOR ATTACHED PRINTING DATA | "ON" "OFF" |
| SORT | SETTING OF SORTING | SETTING EFFECTIVE FOR ATTACHED PRINTING DATA | "ON" "OFF" |
| STAPLE | SETTING OF STAPLING | SETTING EFFECTIVE FOR ATTACHED PRINTING DATA | "ON" "OFF" |
| NUP | SETTING OF N-UP PRINTING | SETTING EFFECTIVE FOR ATTACHED PRINTING DATA | 1, 2, 4, 8 |
| OVERLAY | OVERPLAY OF FORM DATA | SETTING EFFECTIVE FOR ATTACHED PRINTING DATA | CHARACTER STRING OF 16 ALPHANUMERIC CHARACTERS (FILE NAME) |
| STYLE | STYLE SHEET (IMAGE SETTING) | SETTING EFFECTIVE FOR ATTACHED PRINTING DATA | CHARACTER STRING OF 16 ALPHANUMERIC CHARACTERS (FILE NAME) |

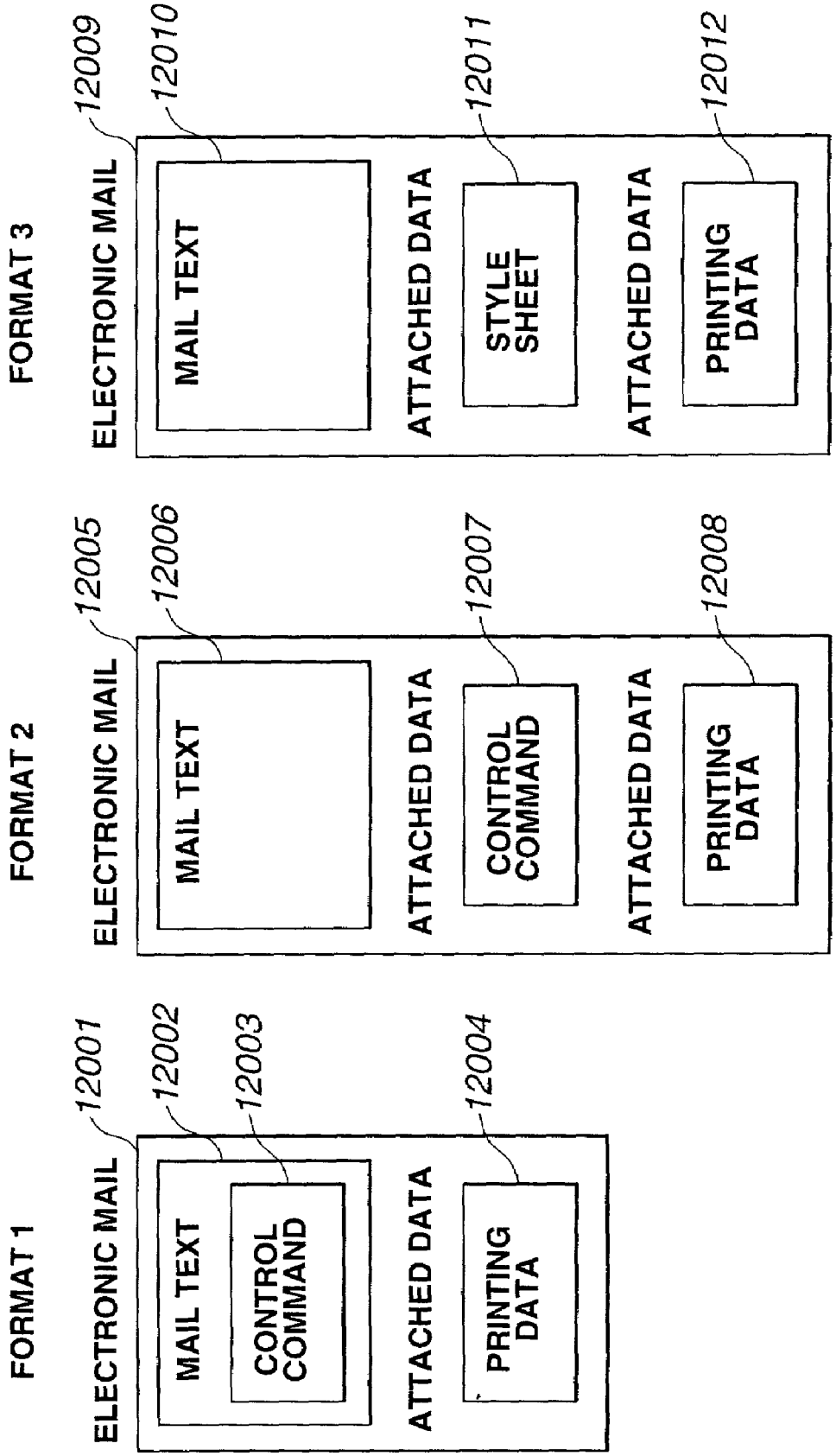

FIG.14

ELECTRONIC MAIL

MAIL TEXT

PASSWORD ○○○○
SET OVERLAY A
PRINT FILE B

ATTACHED FILE A

FORM DATA

ATTACHED FILE B

PRINTING DATA

FIG.15

ELECTRONIC MAIL

MAIL TEXT

PASSWORD △△△△
SET STYLE A
PRINT FILE B

ATTACHED FILE A
STYLE SHEET

- .TYPEFACE OF CHARACTERS
- .SIZE OF CHARACTERS
- .CHARACTER SPACING
- .LINE SPACING
- .SHEET SIZE
- .MARGIN
- .SHEET TRAY

ATTACHED FILE B

PRINTING DATA

HTML-FORMAT DATA

METHOD AND APPARATUS FOR EMAIL-BASED PRINTER

BACKGROUND OF THE INVENTION

1. Field of the Invention

The present invention relates to a printer, a printing method and a printing program having an electronic-mail function, and a storage medium storing the printing program.

2. Description of the Related Art

Printers operating in a network environment have been proposed. Such printers can be subjected to remote control via the network, so that printing, various printer settings, and acquisition of printer information can be performed from a location separated from the location where the printer is installed, such as a host computer or the like.

Such conventional printers have the function of transmitting/receiving an electronic mail (hereinafter also abbreviated as a "mail"). In such printers, a sentence to be transmitted is stored in advance in a ROM (read-only memory).

The electronic mail stored in the ROM is transmitted in accordance with conditions set for each printer.

In a conventional printer operating in a local area network (hereinafter abbreviated as a "LAN"), a fire wall is generally provided between the LAN and an external network in order to improve security. The external network is a network connected to a port different from the port of a router to which the printer is connected.

Although the printer connected to the LAN can transmit/receive an electronic mail to/from the external network, access using telnet, FTP (file transfer protocol), or the like is in most cases prohibited by the fire wall. Accordingly, the range of remote control for the conventional printer with such improved security is limited to control from a host computer within the LAN.

It is also possible to directly control a printer from an external network by changing the setting of a fire wall. In such a case, however, access to the printer may be a security hole, resulting in degradation in security for the overall network. Hence, such an approach is unrealistic.

Thus, in the conventional printer operating in a network, it is difficult to improve security while allowing access from an external network. As described above, the conventional printer has the function of transmitting/receiving an electronic mail to/from an internal network or an external network. However, only a document stored in a ROM is transmitted, and it is impossible to change the contents of the document in accordance with a destination of the electronic mail. Hence, it is inconvenient to use such a printer.

SUMMARY OF THE INVENTION

The present invention has been made in consideration of the above-described problems.

It is an object of the present invention to provide a printer which can perform printing in a mode desired by an external user by utilizing an electronic mail.

It is another object of the present invention to provide a printer which can be controlled from an external network while mitigating degradation in security, and which can transmit a mail to a destination corresponding to the state of a change, a method for controlling the printer, a printing program, and a storage medium storing the printing program.

According to one aspect of the present invention, a printer includes setting means for setting a mode of printing based on a command included within a received electronic mail, and printing means for printing the received electronic mail in the mode of printing set by the setting means.

According to another aspect of the present invention, a printer includes setting means for setting information for transmitting a mail to a destination corresponding to a change in state, and transmission means for transmitting the mail when the state has changed, based on the information set by the setting means.

According to still another aspect of the present invention, a printing method includes a setting step of setting a mode of printing based on a command included within a received electronic mail, and a printing step of printing the received electronic mail in the mode of printing set in the setting step.

According to yet another aspect of the present invention, a method for controlling a printer includes a setting step of setting information for transmitting a mail to a destination corresponding to a change in state, and a transmission step of transmitting the mail when the state has changed, based on the information set in the setting step.

According to still another aspect of the present invention, a printing program includes a setting step of setting a mode of printing based on a command included within a received electronic mail, and a printing step of printing the received electronic mail in the mode of printing state set in the setting step.

According to still another aspect of the present invention, a program for controlling a printer includes a setting step of setting information for transmitting a mail to a destination corresponding to a change in state, and a transmission step of transmitting the mail when the state has changed, based on the information set in the setting step.

According to still another aspect of the present invention, a storage medium stores a printing program that includes a setting step of setting a mode of printing based on a command included within a received electronic mail, and a printing step of printing the received electronic mail in the mode of printing set in the setting step.

According to still another aspect of the present invention, a storage medium stores a program for controlling a printer. The program includes a setting step of setting information for transmitting a mail to a destination corresponding to a change in a state, and a transmission step of transmitting the mail when the state has changed, based on the information set in the setting step.

The foregoing and other objects, advantages and features of the present invention will become more apparent from the following description of the preferred embodiments considered in conjunction with the accompanying drawings.

BRIEF DESCRIPTION OF THE DRAWINGS

FIG. 4 is a summary table listing commands that can be described as mail sentences for the printer 1030 shown in FIG. 3;

FIG. 5 is a schematic diagram illustrating formats of data exchanged by the printer shown in FIG. 1 in a network;

FIG. 11 is a summary table of printing attributes; and

FIGS. 12 through 15 are diagrams, each illustrating electronic mail.

DESCRIPTION OF THE PREFERRED EMBODIMENTS

Preferred embodiments of the present invention will now be described in detail with reference to the drawings. Unless particularly mentioned, the scope of the present invention is not limited to the size, the material, the shape, the relative arrangement and the like of each component described in the embodiments.

The following description of each embodiment of a printer according to the present invention is also applied to each embodiment of a printer control method, a printer control program, and a storage medium storing the printer control program.

First Embodiment

A first embodiment of a printer according to the present invention will now be described with reference to the drawings.

Figure 1:
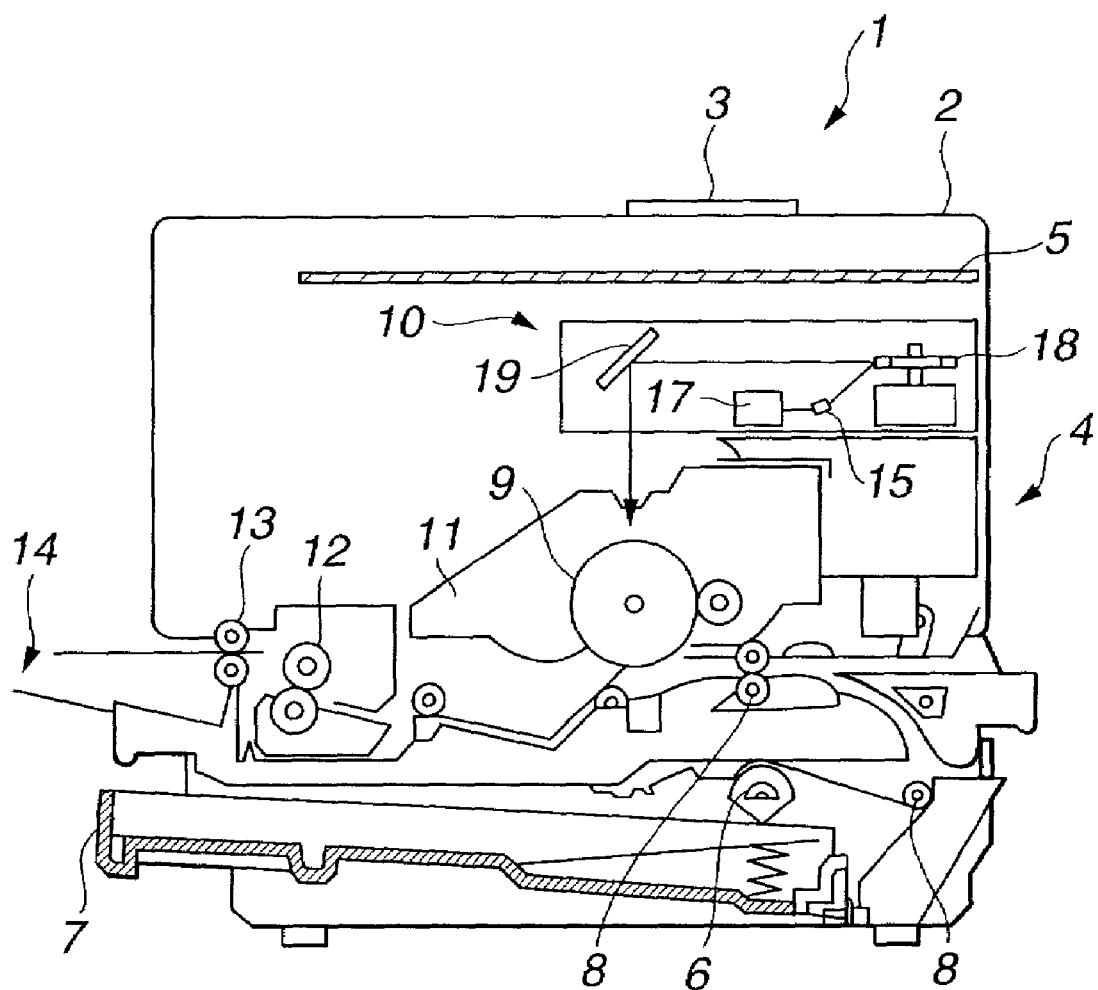
FIG. 1 is a cross-sectional view illustrating a first embodiment of the present invention in which a printer according to the present invention is a laser-beam printer (LBP)

FIG. 1 is a cross-sectional view illustrating the first embodiment in which a printer according to the present invention is a laser-beam printer (LBP).

The printer of the present invention is not limited to a LBP. The printer of the present invention may, of course, also be applied to a printer of any another printing method, such as an ink-jet printer or the like.

A laser-beam printer 1 shown in FIG. 1 includes an operation panel 3 with a switch unit, an LED (light-emitting diode) display unit, and the like, provided on an upper surface of an apparatus main body 2, a printing main-body unit 4 for performing predetermined printing operations, and a printing control device 5 for controlling the printing operation of the printing main-body unit 4 by analyzing inputted character data, control data, and the like.

The printing main-body unit 4 includes a sheet feeding cassette 7 with a sheet feeding roller 6 and accommodating sheets of predetermined recording paper (cut paper), an electrostatic drum 9 where the recording paper is supplied via an appropriate number of conveying rollers 8, an optical system 10 for projecting a laser beam onto the electrostatic drum 9, a developing unit 11 disposed around the electrostatic drum 9 and accommodating toner of a predetermined color, a fixing unit 12 for fixing a toner image obtained as a result of development by the developing unit 11, and a sheet discharge unit 14 for discharging the recording paper with document data and the like printed thereon to the outside of the apparatus via sheet discharging rollers 13.

The optical system 10 includes a semiconductor laser 15 for emitting a laser beam of a predetermined wavelength, a laser driver 17 for driving the semiconductor laser 15, a rotating polygonal mirror 18, and a reflecting mirror 19 for supplying the laser beam onto the electrostatic drum 9 by reflecting the incident laser beam via the rotating polygonal mirror 18.

In the laser-beam printer 1 of the above-described configuration, a video signal from a printing control device 5 is inputted to the laser driver 17, which performs on-off switching of the laser beam emitted from the semiconductor laser 15 in accordance with the video signal.

The laser beam is deflected by the rotating polygonal mirror 18 in directions perpendicular to the plane of FIG. 1 to scan the surface of the electrostatic drum 9, whereby an electrostatic latent image comprising a character pattern and the like is formed on the electrostatic drum 9, and is developed by the developing unit 11 to provide a toner image.

The toner image adhered to the electrostatic drum 9 is transferred onto the recording paper fed from the sheet feeding cassette 7, and is then fixed onto the recording paper by the fixing unit 12. The recording paper with the toner image fixed thereon is discharged outside the sheet discharging unit 14 via the sheet discharging rollers 13.

Figure 2:
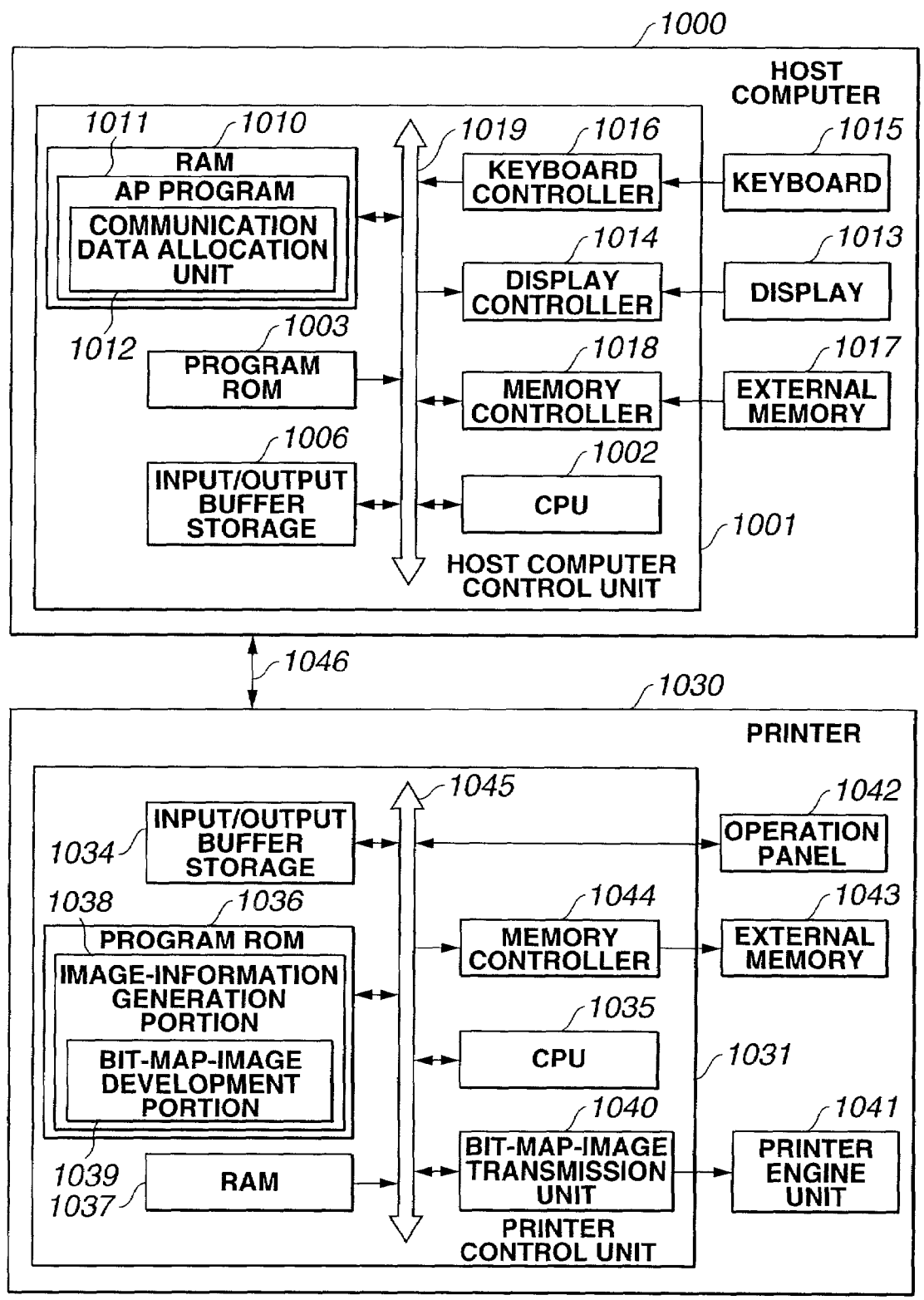
FIG. 2 is a block diagram illustrating a printing system that uses the printer shown in FIG. 1.

Next, a printing system, which uses the printer shown in FIG. 1, will be described with reference to FIG. 2. FIG. 2 is a block diagram of the printing system, which uses the printer shown in FIG. 1. FIG. 2 illustrates the configuration of the system, which includes a host computer 1000 and a printer 1030.

The host computer, 1000 which utilizes the printer 1030, incorporates a host-computer control unit 1001 for controlling the operation of the host computer 1000.

The host-computer control unit 1001 includes a CPU (central processing unit) 1002 for controlling the overall operation of the host computer 1000, a program ROM 1003 incorporating programs describing the operations of the CPU 1002, and an input/output buffer storage 1006 for storing control codes between the host computer 1000 and an external apparatus, as well as data to be transmitted and received data.

The host-computer control unit 1001 also includes a RAM (random access memory) 1010, which is utilized as a working memory for control codes and calculations necessary for interpretation or printing of data, and for processing of printing data.

The RAM 1010 includes an application program (AP program) 1011, serving as a program describing the operations of application software, a driver, and the like, operating in the host computer 1000, and a communication-data allocation unit 1012 for allocating data for printing to respective communication means when performing printing, and for performing scheduling.

The host-computer control unit 1001 includes a display controller 1014 for controlling a display 1013 for displaying an image processed by the host computer 1000 to the user, a keyboard controller 1016 for controlling a keyboard 1015 for accepting a command from the user, a memory controller 1018 for controlling an external memory 1017 utilized for storing printing data, various sets of information relating to the host computer 1000, and the like, and a system bus 1019 for connecting the respective units.

The printer 1030 includes a control unit 1031, which controls operations of the printer 1030. The control unit 1031 includes an input/output buffer storage 1034 for storing control codes and data, a CPU 1035 for controlling the overall operations of the printer 1030, a program ROM 1036 incorporating a program describing the operations of the CPU 1035, and a RAM 1037 utilized as a working memory for control codes and calculations necessary for interpretation and printing of data, and for processing of printing data.

The program ROM 1036 includes an image-information generation portion 1038 for generating various image objects from data received from the host computer 1000, and a bit-map-image developing portion 1039 for developing a bit map in the program ROM 1036.

Programs stored in the program ROM 1036 are used as control programs for the printer of the present embodiment, and the program ROM 1036 is used as a recording medium storing the control programs for the printer of the present embodiment.

The control unit 1031 also includes a bit-map-image transmission unit 1040 for transmitting a bit-map image, obtained as a result of developing an image, to a printer engine unit 1041. The printer engine unit 1041 performs printing on paper.

The control unit 1031 also includes a memory controller 1044 for controlling an external memory 1043 utilized for storing information, such as printing data and the like.

The control unit 1031 also includes a system bus 1045 for connecting an operation panel 1042 for operating the printer 1030 to other respective units.

In the system using the printer of the present embodiment, at least one of the host computer 1000 and the printer 1030 are connected via a network 1046.

Next, the configuration and the functions of the printer 1030 shown in FIG. 2 will be described with reference to FIG. 3, which is a schematic block diagram illustrating the functions of the printer 1030.

An electronic mail transmitted from the host computer 1000 is first stored in a mail memory 3009 via an input/output unit 3000 operating as an input interface, and a mail transmission/reception unit 3001, to become mail data 3010. The mail transmission/reception unit 3001 operates as mail transmission means of the present embodiment.

The functions of the input/output unit 3000 and the mail transmission/reception unit 3001 are realized by cooperation of a program stored in the program ROM 1036, shown in FIG. 2, with the CPU 1035 and the input/output buffer storage 1034.

The function of the mail memory 3009 is realized by the input/output buffer storage 1034, the program ROM 1036, and the RAM 1037 shown in FIG. 2. A sentence and an address (see FIGS. 9A and 9B) of an electronic mail to be transmitted from the printer 1030 according to a predetermined trigger are stored in the mail memory 3009.

Then, a mail analysis unit 3002 analyzes the contents of the mail by analyzing data stored in the mail memory 3009.

That is, when a file is attached to the mail, and execution of printing of the attached file is instructed by a command described in the mail, the mail analysis unit 3002 handles the attached file as printing data 3011, and stores the attached data into a printing-data buffer storage 3015.

The above-described functions of the mail analysis unit 3002 are realized by cooperation of a program stored in the program ROM 1036, shown in FIG. 2, with the CPU 1035.

The function of the printing-data buffer storage 3015 is realized by the RAM 1037.

When the inputted data is ordinary printing data instead of an electronic mail, the input/output unit 3000 directly stores the data in the printing-data buffer storage 3015. When input of printing data has started, the input/output unit 3000 notifies the printing control unit 3014 that inputting has started. The printing control unit 3014 controls the overall operations relating to printing, and provides instructions for each module.

The function of the printing control unit 3104 is realized by cooperation of a program stored in the program ROM 1036, shown in FIG. 2, with the CPU 1035.

Upon notification of the start of input of printing data from the input/output unit 3000 or the mail analysis unit 3002, the printing control unit 3014 instructs a data analysis unit 3003 to start data analysis.

Upon reception of an instruction to start data analysis, the data analysis unit 3003 performs data analysis by reading printing data from the printing-data buffer storage 3015. The data analysis unit 3003 operates as analysis means of the present embodiment.

Control means of the present embodiment includes the input/output unit 3000, the mail transmission/reception unit 3001, the mail analysis unit 3002, the data analysis unit 3003, an image-information generation unit 3004, a bit-map-image transmission unit 3005, a mail generation unit 3006, an information management unit 3007, an engine control unit 3008, the printing control unit 3014, and a printer engine unit 3016 (hereinafter generically termed "the input/output unit 3000 and the like"), shown in FIG. 3. That is, since the operations of the input/output unit 3000 and the like, shown in FIG. 3, depend on the CPU 1035 shown in FIG. 2, the input/output unit 3000 and the like operate as control means for controlling the operations of the printer 1030.

The data analysis unit 3003 outputs an analysis result to the image-information generation unit 3004.

Upon generation of an image to be drawn for one page by the image-information generation unit 3004, the data analysis unit 3003 notifies the printing control unit 3014 that the generation of the image to be drawn for one page has been completed.

When a password 3018 is included within the analyzed data, the data analysis unit 3003 stores the password 3018 in a password memory 3017. The password memory 3017 operates as registration means of the present embodiment.

The password memory 3017 is realized by cooperation of a program stored in the program ROM 1003, shown in FIG. 2, with the program ROM 1036, the RAM 1037, and the CPU 1035. That is, a first password registered in the main body of the printer 1030 and a second password registered in the electronic mail are registered in the password memory 3017. The password 3018 within the password memory 3017 is read by the data analysis unit 3003 and is collated. A collation result of the data analysis unit 3003 is outputted to the printing control unit 3014 and the information management unit 3007.

When a setting instruction command, i.e., a SET command, is included within the analyzed data, the data analysis unit 3003 instructs the printing control unit 3014 to set printing setting parameters.

When an information acquisition command, i.e., a GET command, is included within the analyzed data, the data analysis unit 3003 instructs the information management unit 3007 to acquire information and transmit the acquired information. Then, the image-information generation unit 3004 generates an image to be drawn 3013 (drawing object).

The functions of the data analysis unit 3003 and the image-information generation unit 3004 are realized by cooperation of a program stored in the program ROM 1036, shown in FIG. 2, with the CPU 1035.

Upon receiving notification of the end of generation of the image to be drawn from the data analysis unit 3003, the printing control unit 3014 instructs the bit-map-image transmission unit 3005 to perform a video output.

When reprinting is instructed by a command in a state in which the image to be drawn has already been generated and stored, the printing control unit 3014 instructs the bit-map-image transmission unit 3005 to perform a video output. Upon reception of the instruction, the bit-map-image transmission unit 3005 reads the image to be drawn 3013 from an image-to-be-drawn storage region 3012, converts the read image into a video signal, and transmits the video signal to the printer engine unit 3016.

The function of the bit-map-image transmission unit 3005 is realized by cooperation of a program stored in the program ROM 1036, shown in FIG. 2, with the CPU 1035 and the bit-map-image transmission unit 1040.

The printer engine unit 3016 receives the video signal, prints an image, and discharges a sheet material, such as paper or the like, having the image printed thereon. The function of the printer engine unit 3016 is realized by cooperation of a program stored in the program ROM 1036, shown in FIG. 2, with the CPU 1035 and the printer engine unit 1041.

The operation of the printer engine unit 3016 is controlled by the engine control unit 3008. The engine control unit 3008 is realized by cooperation of a program stored in the program ROM, shown in FIG. 2, with the CPU 1035. The engine control unit 3008 transmits information relating to the printer engine unit 3016 to the information management unit 3007. The printing control unit 3014 also transmits information relating to printing to the information management unit 3007.

The information management unit 3007 manages information relating to the printer 1030, such as a printing state, a toner state, and the like. The information management unit 3007 is realized by cooperation of a program stored in the program ROM, shown in FIG. 2, with the CPU 1035 and the RAM 1037.

Then, the mail generation unit 3006 generates a mail based on information registered in the mail memory 3009, inputted information, or information recorded in the information management unit 3007, and transmits the generated mail to the mail transmission/reception unit 3001. The mail generation unit 3006 operates as mail generation means of the present embodiment. The mail generation unit 3006 is realized by cooperation of a program stored in the program ROM 1036, shown in FIG. 2, with the CPU 1035.

In the above-described manner, a series of operations comprising reception, transmission, analysis, and printing of an electronic mail of the first embodiment are performed.

The operations of the mail analysis unit 3002, shown in FIG. 3, will now be described in detail with reference to FIGS. 4 through 8.

Figure 3:
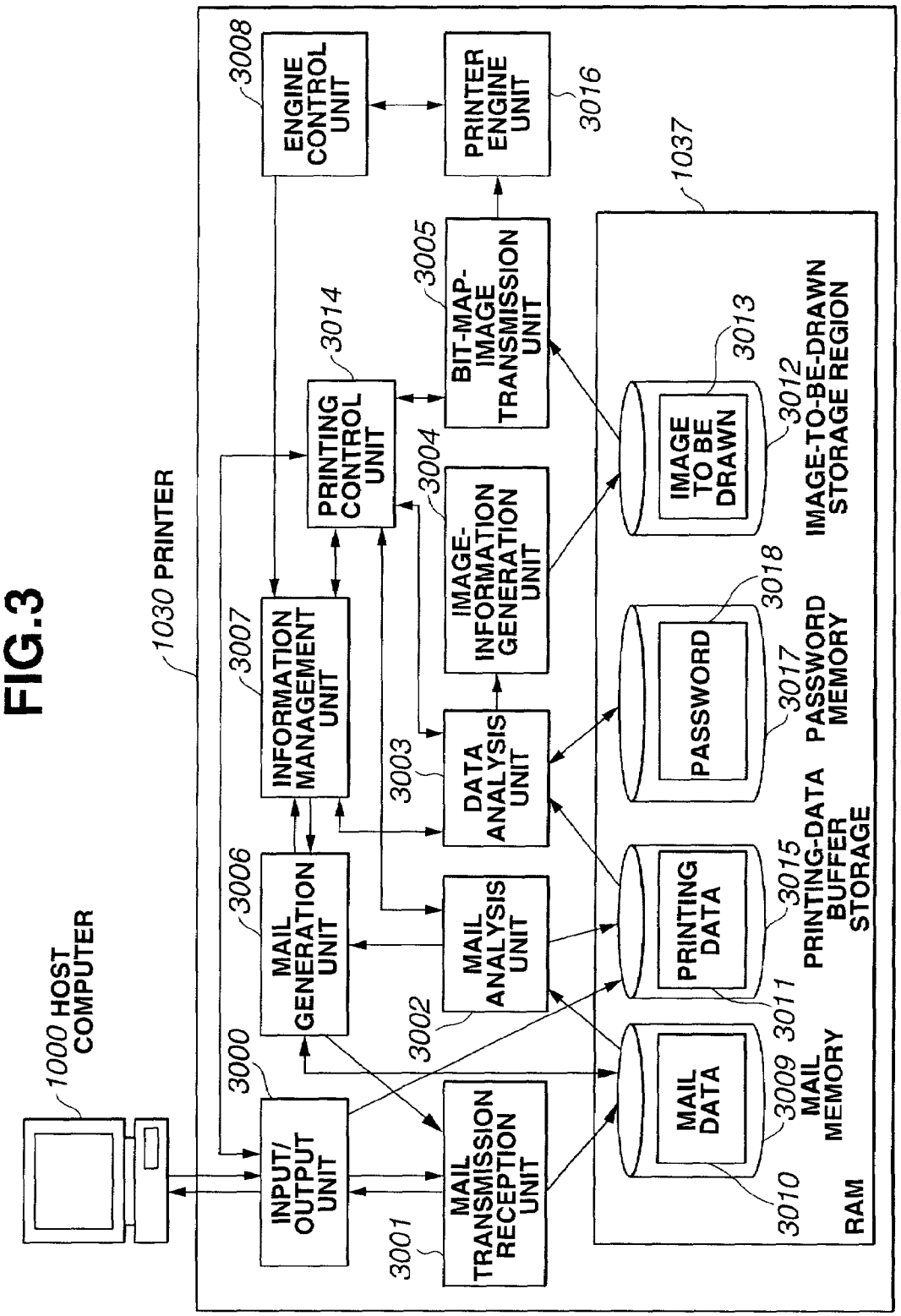
FIG. 3 is a schematic block diagram illustrating the functions of the printer 1030 shown in FIG. 2.

FIG. 4 is a summary table of commands that can be described as the sentences of a mail for the printer 1030 shown in FIG. 3. The printer 103 operates by interpreting a command described as text in the mail. The command includes a command portion and a parameter portion. The command portion and the parameter portion are separated by a space code.

Among the various commands 4001 shown in FIG. 4, "PASSWORD" is a password command for describing a password of the present embodiment. That is, as described in FIG. 4, the password is described after the command. A portion before a line feed is recognized as the password. If a password is registered in the printer, the mail is not analyzed unless the two passwords coincide. A four-digit numerical value is described in the parameter portion. Any other numbers of digits may, of course, be selected.

When a password is registered in advance in the printer, the "PASSWORD" command is compared with the password registered in the printer. Only when the two passwords coincide, does the process of analyzing commands other than the "PASSWORD" command in the mail occur.

When a password is registered in the printer and the "PASSWORD" command is absent in the sentence of the mail, subsequent command analysis processing is not performed.

In the first embodiment, registration of a password in the printer is performed through the operation panel. A password is not registered in the initial state. The registered password is stored in a nonvolatile memory.

"PRINT-FILE" is a command for instructing printing of a file attached to the electronic mail, and is a printing instruction command of the present embodiment. That is, as shown in FIG. 4, printing of the attached file is performed. The name and the data format of the file are described after the command.

In particular, the name and the data format of the attached file are described in the parameter unit. In the first embodiment, a printable data format is PDF. When a data format that cannot be printed is assigned, printing is not performed. Of course, the printable data format is not limited to PDF, and any other appropriate format may also be used.

"SET" is a command for setting parameters for various printing settings. A printing setting can be set through a panel. The "SET" command is a setting instruction command of the present embodiment. That is, as shown in FIG. 4, setting of various printing-setting parameters is performed. The item name and the value of each setting are described after the command. FIG. 11 shows printing-setting parameters that can be set by the "SET" command and referred to by a "GET" command in the first embodiment (to be described later).

That is, it is assumed that a title is defined in advance in each setting item. The titles of setting items and setting values are described in the parameter portion. A numerical value or a character string is described as the setting value in accordance with the setting item.

"GET" is a command for acquiring the set values of the setting items, log information, expendable-item information, the state of the printer, and the like. It is assumed that the name of each of the above-described sets of information has been defined in advance. The "GET" command operates as an information acquisition command of the present embodiment. That is, as shown in FIG. 4, setting parameters for printing, log information, and expendable-item information are acquired. A mail is transmitted upon provision of the "GET" command.

That is, the information name is described in the parameter portion. When acquiring the setting value of a setting item, the title of the item is also described. Upon provision of the "GET" command, a reply mail is transmitted from the printer. Requested information is described in the reply mail.

Commands applied to the printer of the present embodiment are not limited to the commands shown in FIG. 4, but any other arbitrary commands may also be adopted.

FIG. 11 shows a summary table 11001 of printing parameters, which can be set and referred to by the "SET" command and the "GET" command, respectively, in the first embodiment. The summary table 11001 includes the parameter (attribute) name, description, the effective range, and the setting value. The parameter name is described after the SET command and the GET command, and indicates the type of information to be set and referred to. The effective range indicates the object for which the parameter is set. For example, NAME (the name of the printer) is set for the printer, and COPY (the number of copies) is set for printing data. In the first embodiment, two types of information, i.e., information set for the printer, and information set for attached printing data, exist. The setting value is a value that can be set for each parameter.

A parameter NAME is for setting and referring to the name of the printer. The name of the printer is arbitrarily provided by the user, and is used for identifying the printer. The setting value has a maximum length of 16 bytes using a 1-byte character (alphanumeric character).

A parameter SLEEPTIME is for assigning a time (in units of a minute) for entering a sleep mode after inputting of data in the printer has stopped, and is set for the printer. A notation OFF indicating that the printer does not sleep, or a numerical value between 1–60 can be assigned as the setting value.

A parameter LANGUAGE is for setting and referring to the language of a message displayed on the display unit provided on the operation panel unit of the printer, and is set for and refers to the printer. It is assumed that the printer used in the first embodiment supports Japanese and English as display languages. The setting values are JP and EN indicating Japanese and English, respectively.

A parameter COPY is for setting and referring to the number of copies, and is set for and refers to attached printing data. When, for example, printing a document to be distributed at a meeting, it is unnecessary to transmit the same data several times if the number of copies corresponding to the number of attendants is assigned. A numerical value between 1–999 is used as the setting value. When this parameter is not assigned, the number of copy is assumed to be one.

A parameter DUPLEX is for setting and referring to duplex printing, and is set for and referred to for attached printing data. The printer used in the first embodiment is a printer capable of performing duplex printing. A notation ON indicating duplex printing or a notation OFF indicating simplex printing is used as the setting value. When this parameter is not assigned, it is assumed that simplex printing is to be performed.

A parameter SORT is for setting and referring to sorting, and is set for and referred to for attached printing data. This parameter is for sorting respective copies when printing a plurality of copies. When using an apparatus generally called a sorter, there are various sorting methods, such as a method of inserting partition paper. The printer used in the first embodiment is assumed to be a printer capable of mounting a sorter. A notation ON indicating sorting, or a notation OFF indicating that sorting is not performed is used as the setting value. When this parameter is not assigned, it is assumed that sorting is not to be performed.

A parameter STAPLE is for setting and referring to stapling, and is set for and referred to for attached printing data. Stapling is for binding printed sheets of each copy using staples. The printer used in the first embodiment is assumed to support a stapling function. A notation ON indicating stapling or a notation OFF indicating that stapling is not performed is used as the setting value. When this parameter is not assigned, it is assumed that stapling is not to be performed.

A parameter NUP is for setting and referring to N-up printing (for printing a plurality of pages on a single sheet), and is set for and referred to for attached printing data. The printer used in the first embodiment is assumed to support 2-page printing, 4-page printing, and 8-page printing in addition to ordinary printing (one-page printing). A numerical value 1 indicating 1-page printing, 2 indicating 2-page printing, 4 indicating 4-page printing or 8 indicating 8-page printing is used as the setting value. When this parameter is not assigned, it is assumed that 1-page printing is to be performed.

A parameter OVERLAY is for setting a function of overlaying form data on attached printing data (document data), and is set for and referred to for attached printing data. By assigning an attached file of form data to be overlaid, form data can be printed in a state of being superposed on attached printing data (document data) to be overlaid, which is assigned by the PRINT-FILE command.

A parameter STYLE is for setting a function of setting a format (the character size, the character interval, the sheet size, margin, the sheet tray, and the like) for printing data, and is set for and referred to for attached printing data. This parameter is particularly effective when the attached printing data assigned by the PRINT-FILE command has an HTML (Hyper Text Markup Language) format.

Although the above-described parameters can be set and referred to in the first embodiment, any other parameters (attributes) may also be set and referred to.

FIG. 12 is a diagram illustrating the configuration of an electronic mail. The format used in the first embodiment is format 1. An electronic mail 12001 includes mail text 12002 and attached printing data 12004. The mail text 12002 includes control commands, such as the PASSWORD command, the PRINT-FILE command, the SET command, the GET command, and the like. Although, in the first embodiment, a description will be provided using the format 1, the following description is also effective even if the format of the electronic mail is in format 2 or format 3.

An electronic mail 12005 of format 2 includes mail text 12006, attached control command data 12007, and attached printing data 12008. The format 2 differs from the format 1 in that control commands are attached as an independent file.

An electronic mail 12009 of format 3 includes mail text 12010, a style sheet 12001 describing composition information and layout information of printing data, and printing data 12012. In this case, the contents to be printed are described in the printing data, and the composition information is described in the style sheet.

The situation is the same when combining the format 1, the format 2, and the format 3. Although, in the first embodiment, attached printing data comprises only one file, the situation is the same when a plurality of files are used. In this case, a method in which setting of control commands and the style sheet are effective for all printing data, and a method in which setting of control commands and the style sheet are effective only for specific printing data can be considered. When the setting of control commands and the style sheet are effective only for specific printing data, data (a file) to be processed by the control commands and the style sheet is assigned by the name or the order of the file. The situation is the same in a format in which printing data is not attached and only control commands are present. In this case, the control commands cannot set and refer to a parameter effective for a job.

Examples of electronic mails will now be described with reference to FIGS. 13, 14 and 15.

Figure 13:
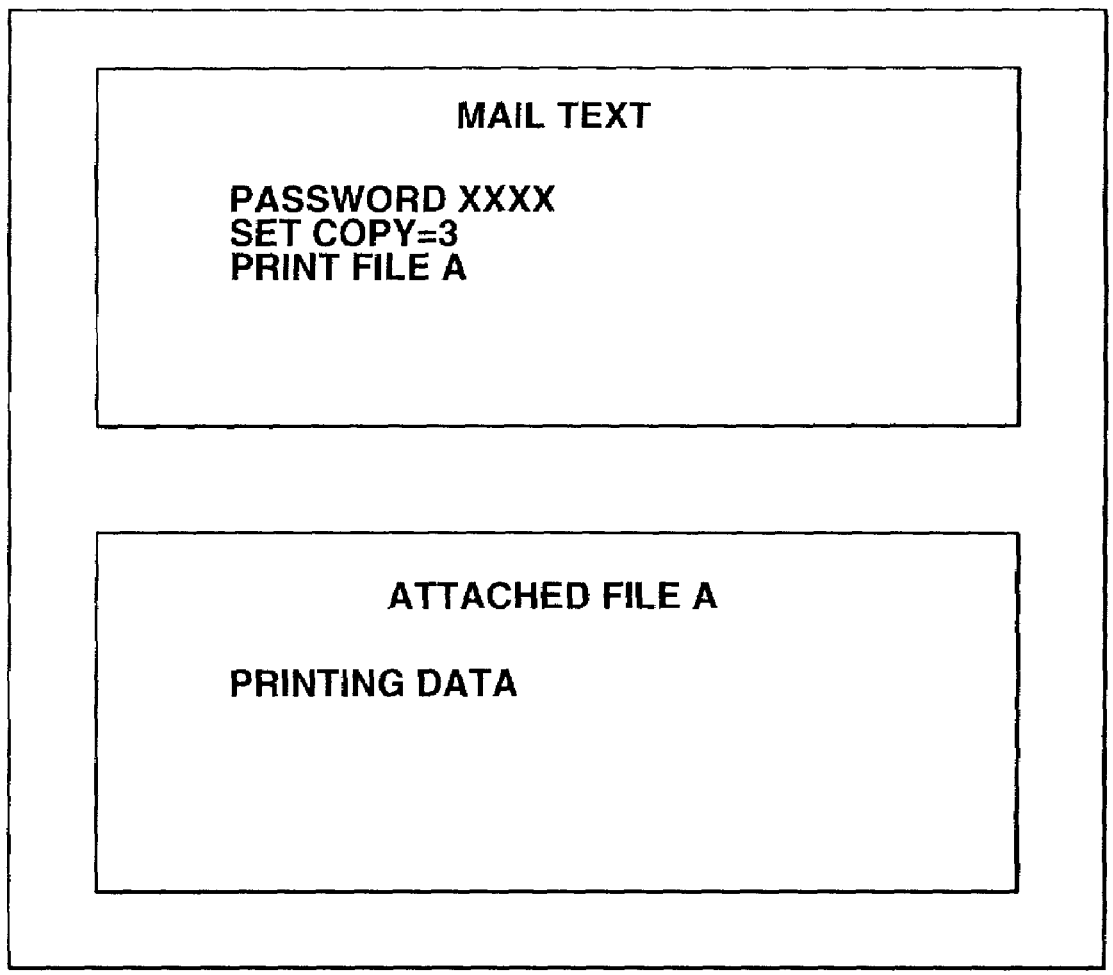

FIG. 13 illustrates a case in which three copies of an attached file A are to be printed. Authentication is performed by the PASSWORD command, setting to print three copies is performed by the SET command, and three copies of the attached file A are printed by the PRINT-FILE command.

FIG. 14 illustrates an electronic mail in which data of an attached file A is used as form data, which is printed by being superposed on each page of printing data of an attached file B. Authentication is performed by the PASSWORD command, the attached file A is set as the form by the SET command, and printing is performed by synthesizing the attached file B with the form by the PRINT-FILE command.

FIG. 15 illustrates an electronic mail in which printing is performed by setting the format of printing data of an attached file B by the style sheet of an attached file A. Authentication is performed by the PASSWORD command, the attached file A is set as the format by the SET command, and an attached file B is printed in the set format by the PRINT-FILE command. The format in the first embodiment includes setting of the typeface and the size of characters, setting of the character interval, setting of the line interval, setting of the sheet size (A3, A4, a ostcard, vertical, horizontal, or the like), setting of upper, lower, left and right margins of the sheet, and setting of the sheet tray (automatic, manual insertion, a cassette, or the like).

In the first embodiment, the user performs input (formation and transmission of an electronic mail) to the printer using application software for reading a mail in a personal computer (PC). In general, such application software can be attached to the mail by assigning an arbitrary file.

In another input method, a module called a printer driver operating in a PC generates and transmits an electronic mail. For example, printing is instructed from application software in the PC as in ordinary printing. A selected printer (printer driver) is configured so as to print an electronic mail. The printer driver generates an electronic mail for a mail address from the printer, which has been stored in advance, converts (does not convert if it is unnecessary) a file to be printed into a predetermined format, and adds the file to the electronic mail. Settings of printing attributes (parameters) are added to the file or described in the mail text, and the electronic mail is transmitted.

Next, a format of data to be exchanged between the printer of the first embodiment and the network will be described with reference to FIG. 5. FIG. 5 is a schematic diagram illustrating a format of data to be exchanged by the image forming apparatus of the first embodiment on the network.

As shown in FIG. 5, data to be exchanged by the printer of the first embodiment includes a PDU (protocol data unit) 501 of SMTP positioned above a session layer of OSI (open systems interconnection). Commands, attached files and mail texts, shown in FIG. 4, are stored in the PDU 501. The PDU 501 is encapsulated by a transport layer, a network layer and a data-link layer provided as lower layers.

That is, in the transport layer, a TCP (transmission control protocol) header 503 is provided in order to be utilized by the TCP. In the TCP header 503, in order to exchange an electronic mail by the printer of the first embodiment, No. 25 of SMTP (simple mail transfer protocol) and No. 110 of POP3 (post office protocol version 3) are described as the number of a transmission port and the number of a destination port, respectively.

The PDU 501 encapsulated by the TCP header 503 is thereafter encapsulated by IP headers 505 and 507, to become a PDU exchanged at respective layers. HDLC indicates High-Level Data Link Control Procedure. Any other appropriate protocol, such as LLC (Logical Link Control) or the like, may also be utilized as the protocol for the data-link layer.

IP addresses are described in an IP header 505 as the address of a destination and the address of a transmitter. An IPv4 -bit address or an IPv6 8-bit address may be used as the IP address.

As described above, in data exchanged by the printer of the first embodiment, the mail text, the attached file and various commands are stored in the PDU above the session layer. Accordingly, the printer, which has received data, processes commands by analyzing the contents described in the PDU 501 above the session layer.

Figure 6:
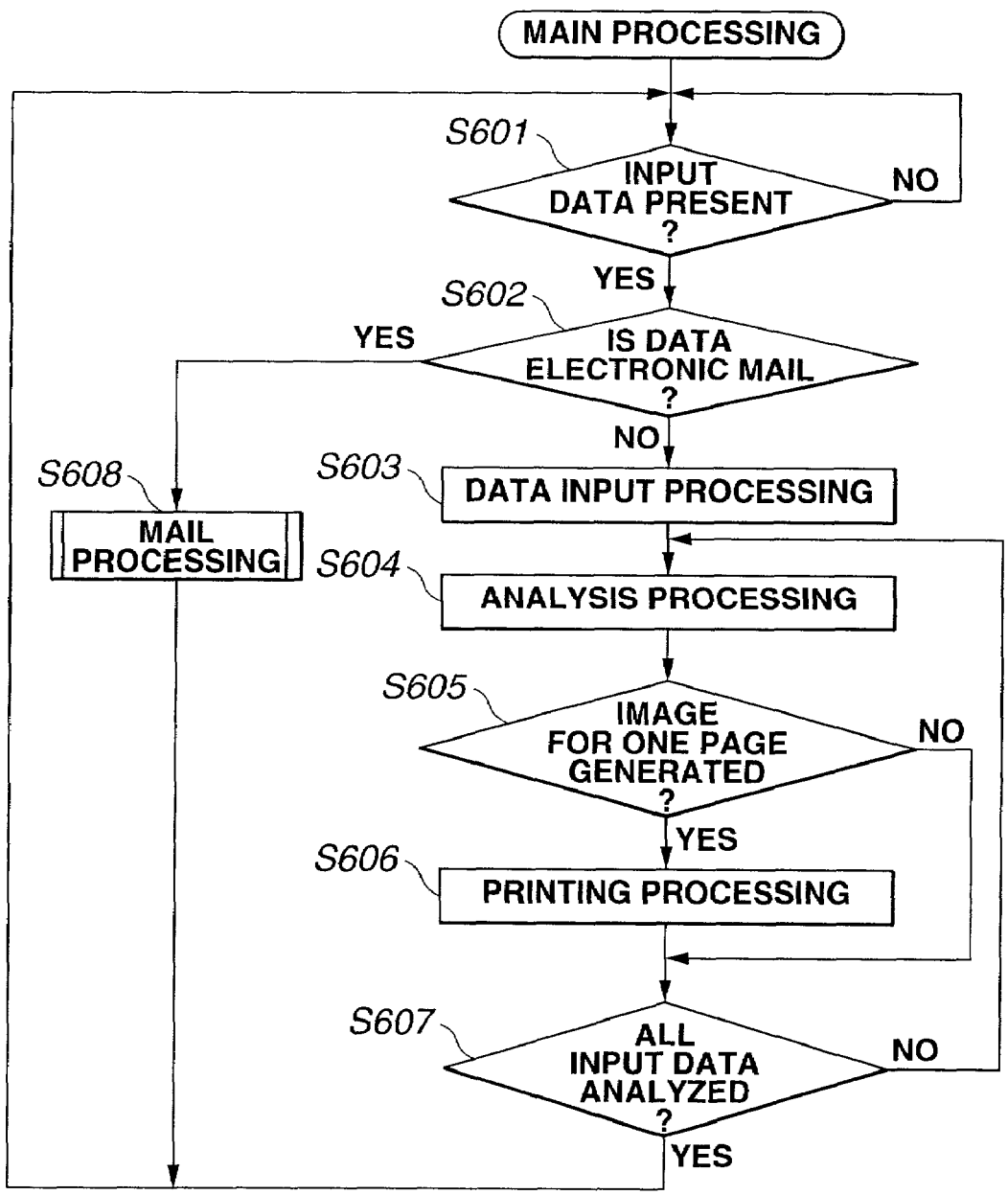
FIG. 6 is a flowchart illustrating the operation of the printer shown in FIG. 1.

Next, the operation of the printer of the first embodiment shown in FIGS. 1, 2 and 3 will be described with reference to the flowchart of FIG. 6. A program relating to the flowchart shown in FIG. 6 is stored in the program ROM 1036, and is executed by the CPU 1035.

First, in step S601, a loop for awaiting input data is provided. Upon the start of input of data from the host computer, the process proceeds to step S602. In step S602, it is determined whether the inputted data is an electronic mail. If the result of the determination in step S602 is affirmative, the process proceeds to mail processing in step S608.

When the inputted data is ordinary printing data instead of an electronic mail, the process proceeds to step S603, where data input processing is performed. In the data input processing, the data is inputted into the image-to-be-drawn storage region 3012, and information in a job management table is updated. In step S604, processing to analyze the inputted data is performed.

In step S605, it is determined whether the generation of an image 10 for one page has been completed. If the result of the determination in step S605 is affirmative, the process proceeds to printing processing in step S606, where a bit-map image is converted into a video signal, which is transferred to the printer engine unit 3016 to perform actual printing and sheet discharging processing.

In step S607, it is determined whether the inputted data has been completely analyzed. If the result of the determination in step S607 is affirmative, the process returns to step S601. If the result of the determination in step S607 is negative, the process returns to step S604, and the analysis processing is repeated.

Next, the operation of mail processing in step S608 of FIG. 6 will be described with reference to the flowchart of FIG. 7. A program relating to the flowchart shown in FIG. 7 is stored in the program ROM 1036, and is executed by the CPU 1035.

Figure 7:
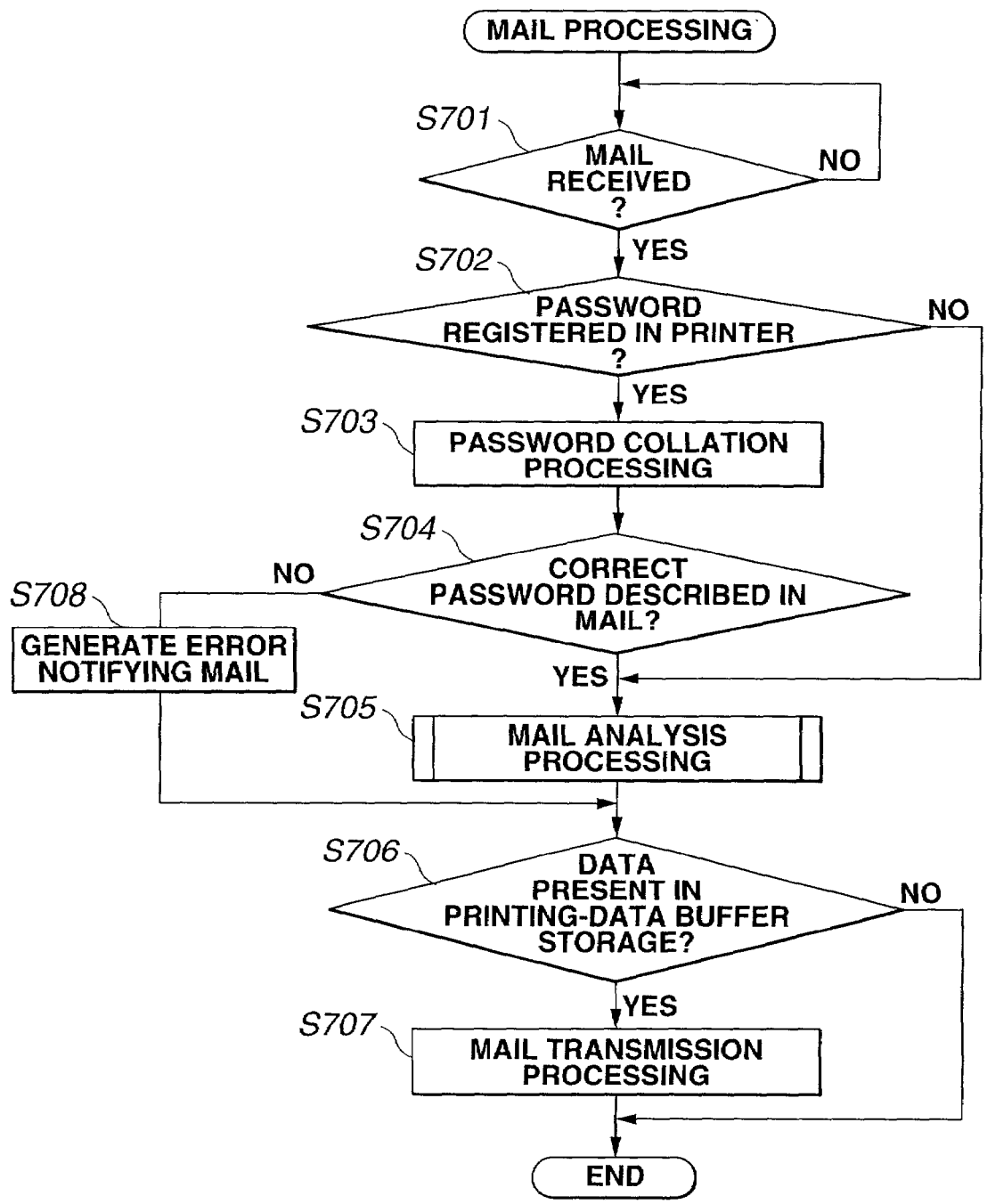
FIG. 7 is a flowchart illustrating the operation of the mail processing shown in FIG. 6.

As shown in FIG. 7, the printer of the first embodiment first confirms, in step S701, the end of reception of the mail data.

That is, the received mail data is first stored in the mail memory 3009 (shown in FIG. 3). When mail data for one page has been inputted, it is assumed that reception of the mail has been completed, and the process proceeds to step S702.

In step S702, it is determined whether a password is registered in the printer. If the result of the determination in step S702 is affirmative, the process proceeds to step S703, where processing to correlate the password is performed. If the result of the determination in step S702 is negative, mail analysis processing (step S705) is performed without performing processing to correlate the password.

In step S703, the "PASSWORD" command is retrieved by analyzing the mail sentence, and correlation as to whether or not a password after the "PASSWORD" command coincides with the password registered in the printer is performed.

Then, in step S704, it is determined whether the "PASSWORD" command is present in the mail sentence and coincides with the password registered in the printer. If the result of the determination in step S704 is affirmative, the process proceeds to step S705. If the result of the determination in step S704 is negative, the process proceeds to step S708, where an error notification mail is transmitted.

In step S705, mail analysis processing is performed. The mail analysis processing will be described later with reference to FIG. 8.

In step S706, it is determined whether data (a mail) to be transmitted is present in the printing-data buffer storage. If the result of the determination in step S706 is affirmative, the process proceeds to step S707, where mail transmission processing is performed. If the result of the determination in step S706 is negative, the process is terminated.

Figure 8:
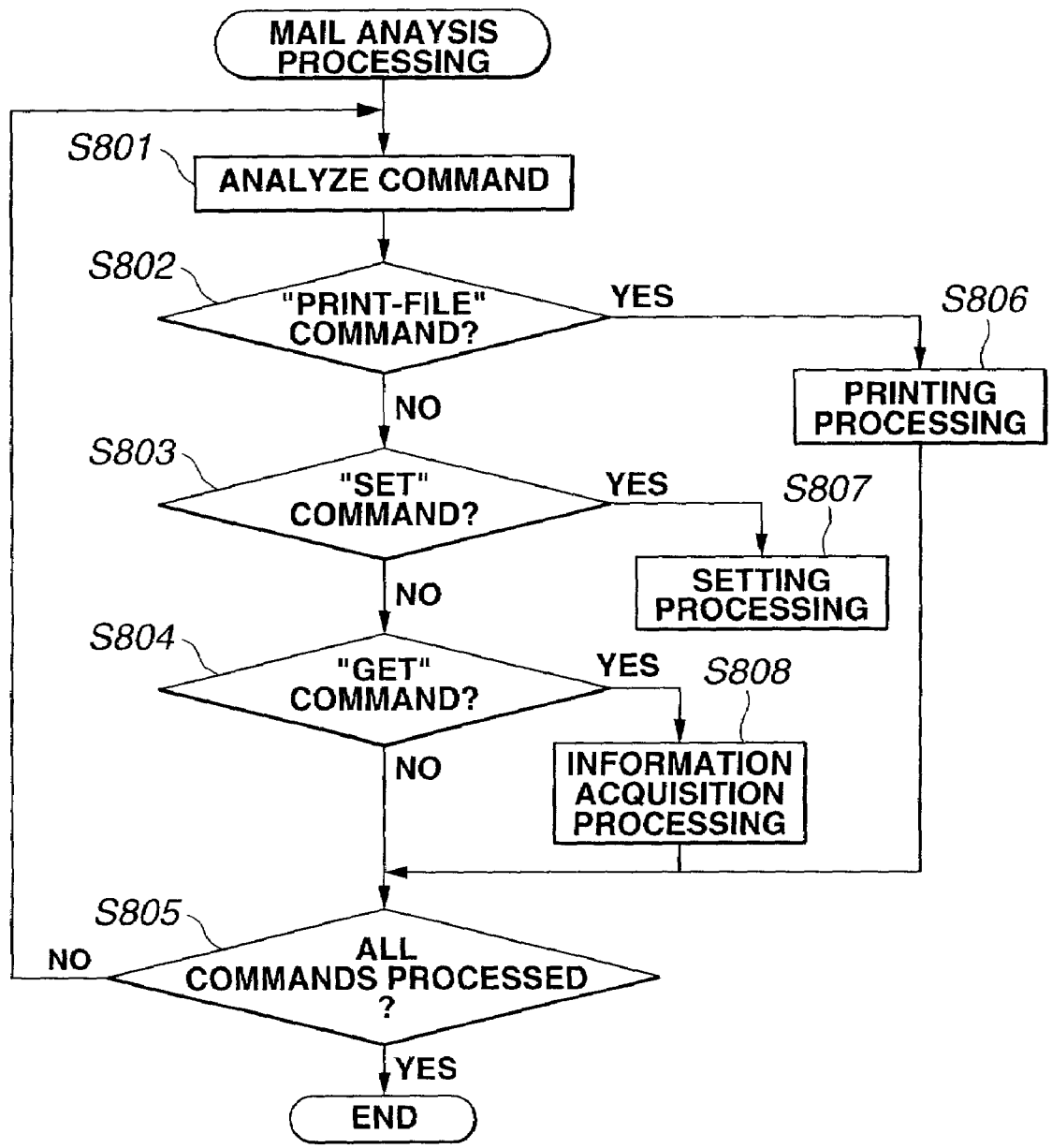
FIG. 8 is a flowchart illustrating the operation of the mail analysis processing shown in FIG. 7.

The mail analysis processing in step S705 will now be described with reference to the flowchart of FIG. 8. A program relating to the flowchart shown in FIG. 8 is stored in the program ROM 1036, and is executed by the CPU 1035.

First, when performing the mail analysis processing, the printer of the first embodiment reads, in step S801, a command described as text data in the mail text.

In step S802, it is determined whether the read command is the "PRINT-FILE" command. If the result of the determination in step S802 is affirmative, the process proceeds to step S806, where printing processing is performed.

In the printing processing, the same processing as during ordinary printing is performed by storing the printing data 3011 of the attached file into the printing-data buffer 3015. Printing is performed in accordance with a setting set by the SET command.

In the first embodiment, the format of the attached file is assumed to be the PDF. If data has the PDF, it is assumed that the data analysis unit can perform processing by automatically determining the data format. If data other than in the PDF is attached, printing may not be performed.

When the command read in step S801 is the "SET" command, the process proceeds to step S807, where setting processing is performed. For example, when COPY=3 is assigned by the SET command, a setting to print three copies of printing data of the attached file assigned by the PRINT-FILE command is made. When the command read in step S801 is the "GET" command, information acquisition processing is performed. In information acquisition processing, the acquired information is stored in the input/output buffer storage 1034 as data to be transmitted.

In step S805, it is determined whether all commands described in the inputted mail have been processed. If the result of the determination in step S805 is affirmative, the process is terminated. If the result of the determination in step S805 is negative, the process returns to step S801, and the process is repeated.

As described above, according to the first embodiment, commands are described in the text of an electronic mail. The printer, which has received the electronic mail describing the commands, performs printing processing, setting processing and information acquisition processing by analyzing the commands. Hence, even when the printer is connected via an external network and a fire wall, and access to the printer other than an electronic mail is prohibited, it is possible to control the printer by transmitting an electronic mail, and improve the usability of the printer.

Second Embodiment

Next, a description will be provided of a printer according to a second embodiment of the present invention, with reference to the drawings.

In the second embodiment, the printer automatically transmits a mail to a registered mail address by using the generation of an error, or the like as a trigger.

The second embodiment is the same as in the above-described first embodiment except that an electronic mail is transmitted according to a predetermined trigger. That is, the description with reference to FIGS. 1 through 8 used in the first embodiment can also be applied to the printer of the second embodiment. A description will now be provided only of items of the printer of the second embodiment different from the printer of the first embodiment.

First, the operation when generating a mail to be transmitted in the printer of the second embodiment will be described with reference to FIGS. 9A and 9B.

Figure 9A:
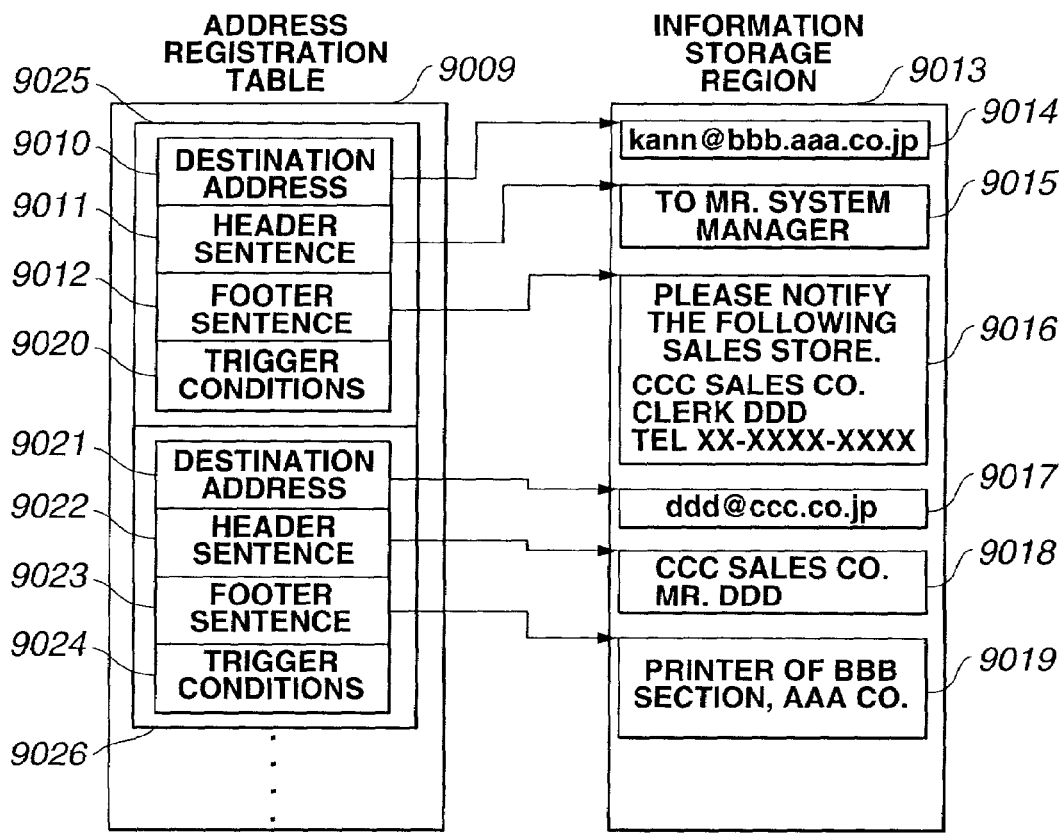
FIGS. 9A and 9B are schematic diagrams illustrating the operation of generating mail to be transmitted, in a printer according to a second embodiment of the present invention.
Figure 9B:
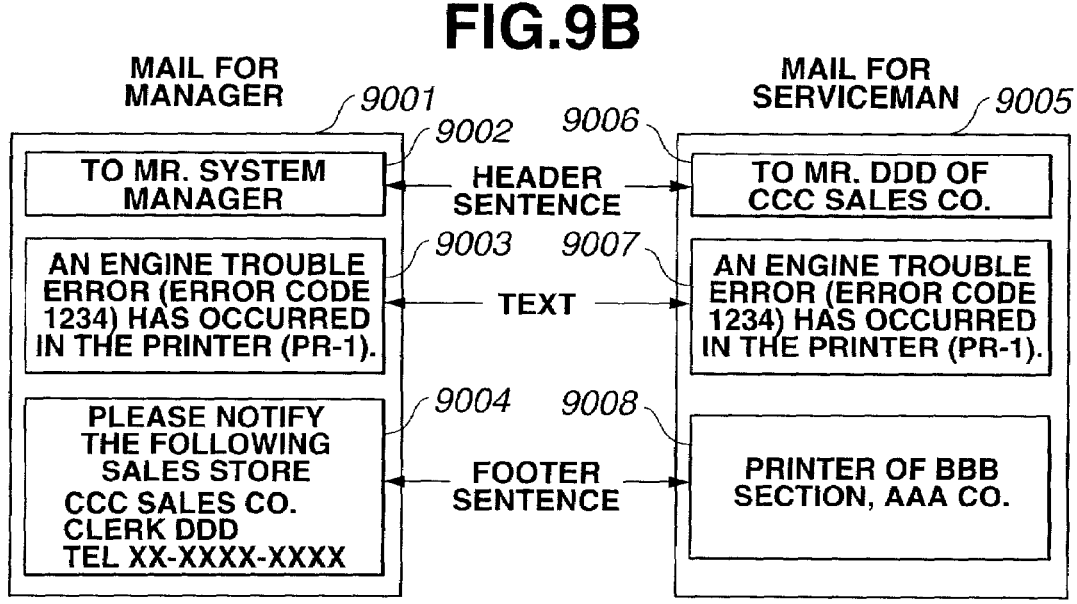

FIGS. 9A and 9B are schematic diagrams illustrating an operation of generating a mail to be transmitted in the printer of the second embodiment: FIG. 9A is a schematic diagram of an address registration table 9009 and an information storage region 9013; and FIG. 9B is a schematic diagram illustrating a mail generated based on information stored in the address registration table 9009 and the information storage region 9013 shown in FIG. 9A.

The printer of the second embodiment has the function of automatically transmitting a mail to a registered mail address by using the generation of an error, or the like, as a trigger. This function of automatically transmitting a mail is realized by cooperation of a program stored in the program ROM 1036, shown in FIG. 2, with the CPU 1035. Address registration can be performed by a command provided from the program, based on a command inputted through the operation panel. That is, it is possible to set the header sentence, the footer sentence, and the trigger condition when registering an address.

In the case shown in FIGS. 9A and 9B, addresses of two people, i.e., the manager and the serviceman of the printer, are shown. Of course, the number of registered addresses is not limited to two, but any other arbitrary number may be selected. Destinations of mails are not limited to the manager and the serviceman of the printer, but any other arbitrary destinations may also be selected.

The address registration table 9009 and the information storage region 9013 shown in FIG. 9A are registered, for example, in the RAM 1037 shown in FIG. 2 or the mail memory 3009 shown in FIG. 3

A plurality of addresses can be registered in the address registration table 9009. First address information 9025 includes a destination-address pointer 9010, a header-sentence pointer 9011, a footer-sentence pointer 9012, and trigger conditions 9020.

The destination-address pointer 9010 indicates a destination address 9014 stored in the information storage region 9013. The header-sentence pointer 9011 indicates a header sentence 9015. The footer-sentence pointer 9012 indicates a footer sentence 9016.

Conditions for transmitting a mail, for example, at the generation of an error, the shortage of an expendable item, and the like, are registered as the trigger conditions 9020. These conditions are set in advance by the user on a setting picture frame according to a setting program.

Similarly, in second address information 9026, a destination-address pointer 9021 indicates a destination address 9017 stored in the information storage region 9013. A header-sentence pointer 9022 indicates a header sentence 9018. A footer-sentence pointer 9023 indicates a footer sentence 9019.

Conditions for transmitting a mail, for example, at the generation of an error, the shortage of an expendable item, and the like are registered as the trigger conditions 9024. These conditions are set in advance by the user on a setting picture frame according to a setting program.

It is assumed that in the address information 9025, information for the printer manager is registered, and in the address information 9026, information for the serviceman is registered.

A mail 9001 shown in FIG. 9B is an example of a mail for the manager. The mail 9001 includes a header sentence 9002, a text 9003, and a footer sentence 9004. The header sentence 9002 is generated by referring to the header sentence 9015. The footer sentence 9004 is generated by referring to the footer sentence 9016.

Similarly, a mail 9005 shown in FIG. 9B is an example of a mail for the serviceman. The mail 9005 includes a header sentence 9006, a text 9007 and a footer sentence 9008. The header sentence 9006 is generated by referring to the header sentence 9018. The text 9007 is generated by the printer in accordance with a trigger. The footer sentence 9008 is generated by referring to the footer sentence 9019.

Although, in the foregoing description, with reference to FIGS. 9A and 9B, two sentences, i.e., a header sentence and a footer sentence, are used as stylized sentences, in order to simplify processing, the present embodiment is not limited to such an approach, but one sentence or at least three sentences may also be prepared for each address as stylized sentences.

Figure 10:
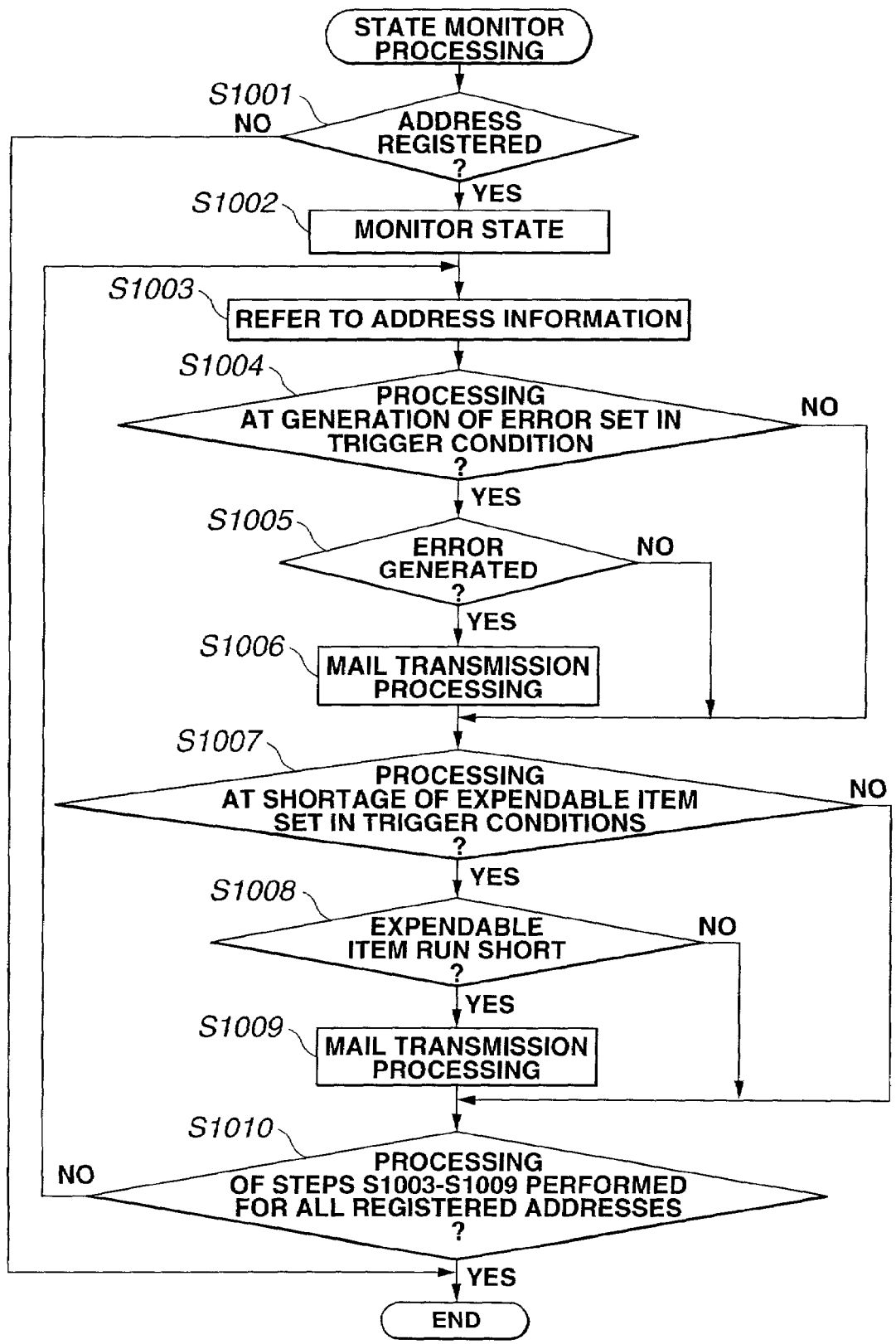
FIG. 10 is a flowchart illustrating the operations in monitoring a state and automatic mail transmission processing in the printer of the second embodiment.

Next, a description will be provided of operations, particularly a mail transmission operation, of the printer of the second embodiment with reference to FIG. 10. FIG. 10 is a flowchart illustrating processes for monitoring a state and automatic mail transmission in the printer of the second embodiment. A program relating to the flowchart shown in FIG. 10 is stored in the program ROM 1036, and is executed by the CPU 1035.

In step S1001, it is determined whether an address registration is present by referring to the address registration table 9009. If the result of the determination in step S1001 is negative, the process is terminated. That is, it is determined whether an address where a change in state is to be notified is registered.

If the result of the determination in step S1001 is affirmative, the process proceeds to step S1002, where the state (presence/absence of an error, and the state of expendable items) is monitored.

In step S1003, information relating to an address is read from the address registration table 9009.

In step S1004, it is determined whether "distribution of a mail when an error has occurred" is set as the trigger condition by referring to the trigger conditions in the address registration table. If the result of the determination in step S1004 is affirmative, the process proceeds to step S1005. If the result of the determination in step S1004 is negative, the process proceeds to step S1007.

In step S1005, it is determined whether an error operation has been generated by referring to the result in step S1003. If the result of the determination in step S1005 is affirmative, the process proceeds to step S1006, where a mail is transmitted in accordance with the address registration table 9009. The error operation is, for example, a sheet jam, a mechanical problem in the printer, breakage, or the like.

In step S1007, it is determined whether "distribution of a mail when an expendable item has run short" is set as the trigger condition by referring to the trigger conditions in the address registration table. If the result of the determination in step S1007 is affirmative, the process proceeds to step S1008. If the result of the determination in step S1007 is negative, the process proceeds to step S1010.

In step S1008, it is determined whether an expendable item has run short by referring to the result in step S1003. If the result of the determination in step S1008 is negative, the process proceeds to step S1009, where a mail is transmitted in accordance with the address registration table 9009. Expendable items include toner, printing paper and the like.

In step S1010, it is determined whether the processing of steps S1003–1009 has been performed for all addresses registered in the address registration table. If the result of the determination in step S1010 is negative, the process returns to step S1003, and the process is repeated.

As described above, in the printer of the second embodiment, since the header sentence, the footer sentence, and the trigger condition are registered for each destination address and a mail formed for each destination address is transmitted, it is possible to improve the usability of information transmission by mail.

Although in the foregoing second embodiment, a description has been provided about two cases, i.e., the generation of an error and shortage of an expendable item, as triggers for transmitting a mail from a printer, the present invention is not limited to such cases. For example, triggering may be performed when a predetermined time period has lapsed after using a printer, or when printing of a predetermined number of sheets has been performed. Alternatively, a mail address where a mail is to be transmitted when an error has occurred and a mail address where a mail is to be transmitted when an expendable item has run short may be set and registered, and a mail may be transmitted to the set mail address when an error has occurred, or when an expendable item has run short.

Although, in the above-described second embodiment, processing of registering an address is performed according to a control command provided from a program present in the printer, the present invention is not limited to such a case. That is, as in the first embodiment, a control command for address registration processing may be described in an electronic mail, and the address registration processing may be performed according to a remote operation using the electronic mail.

Although in the above-described embodiments, registration of a password in the main body of the printer is performed through a panel operation, the present invention is not limited to such an approach. For example, the registration of a password may be performed by a control command provided from a program present in the printer, or a control command described in an electronic mail.

Although in the above-described embodiments, the present invention is described as embodied in a printer, the present invention is not limited to a printer. For example, the printer of the present invention may be embodied in a facsimile apparatus, or a combined apparatus of a printer and a facsimile apparatus.

As described above, according to the embodiments of the present invention, for example, even when access using FTP or telnet is controlled between an external network and a printer by a fire wall or the like, if access using SMTP, POP3, or the like, can be performed, by describing control commands in the mail text it is possible to perform remote control of the printer and improve usability while maintaining security.

Since the received electronic mail is first stored in a mail memory and the stored electronic mail is analyzed, it is unnecessary to perform instantaneous processing, which lightens the load on the printer.

Since a printing instruction command for instructing processing of printing, for example, a file attached to an electronic mail is included as a control command described in the electronic mail, control of the printer, such as direct printing of data attached to the mail, can be performed.

Since a command to instruct setting of a printer is included as a control command, it is possible to perform a remote operation of setting of the printer, and further improve usability.

Since by registering in advance a first password in a printer, and describing a password command for assigning a second password in an electronic mail, possibility of each type of control is determined based on a correlation result between the first password and the second password, it is possible to mitigate incorrect control of the printer, and further improve safety.

Since an information acquisition command is included as a control command, even a user at a remote location can easily obtain information relating to a printer.

Since when the state of a printer has changed, an electronic mail for a destination address corresponding to the change is transmitted to the destination address, it is possible to flexibly transmit an electronic mail corresponding to each destination address, and further improve usability.

Since a destination address, a header document, and a footer document corresponding to a destination of an electronic mail are stored in a mail memory, and a trigger condition corresponding to a change in the state of a printer is set for each destination address, it is possible to set a destination address in accordance with a change (trigger) in the state of the printer, and to transmit an appropriate electronic mail to each destination address.

Since a case of an error operation of a printer, a time to exchange an expendable item, or the like, can be set as a change (trigger) in the state of the printer, usability can be further improved.

As described above, according to the present invention, even in a printer in which a remote operation using FTP, telnet, or the like, is prohibited by a fire wall, by analyzing and executing control commands described in an electronic mail it is possible to perform printing in a state desired by the user even from outside of a local area network.

Since, when there is a change in a state, a mail is transmitted to a destination corresponding to the change, it is possible to transmit a mail to a person who must recognize the change in the state.

The individual components shown in outline or designated by blocks in the drawings are all well known in the printer, printing method, printing program, and storage medium arts, and their specific construction and operation are not critical to the operation or the best mode for carrying out the invention.

While the present invention has been described with respect to what are presently considered to be the preferred embodiments, it is to be understood that the invention is not limited to the disclosed embodiments. To the contrary, the present invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A printer comprising:
   a receiving unit for receiving an electronic mail including a setting file for setting a format, a plurality of print files, and a message body that includes information to designate the setting file and information to designate the plurality of print files;
   a formatting unit for formatting the plurality of print files in the format set by the setting file; and
   a printing unit for printing the plurality of print files, designated by the information to designate the setting file, in the format set by the setting file.

2. A printer according to claim 1, wherein the setting file designates the plurality of print files to be printed by a name of the plurality of print files.

3. A printer according to claim 1, wherein the setting file designates the plurality of print files to be printed by an order of the plurality of print files.

4. A printer according to claim 1, wherein the setting file includes a style sheet and the plurality of print files includes HTML data.

5. A printer comprising:
   a receiving unit for receiving an electronic mail including a plurality of files and a message body that includes information to set a format and information to designate the plurality of print files;
   a formatting unit for formatting the plurality of print files in the format set by the information to set the format; and
   a printing unit for printing the plurality of print files, designated by the information to designate the plurality of print files, in the format set by the information to set the format.

6. A printing method comprising:
   a receiving step for receiving an electronic mail including a setting file for setting a format, a plurality of print files, and a message body that includes information to designate the setting file and information to designate the plurality of print files;
   a formatting step for formatting the plurality of print files in the format set by the setting file; and
   a printing step for printing the plurality of print files, designated by the information to designate the setting file, in the format set by the setting file.

7. A printing method according to claim 6, wherein the setting file designates the plurality of print files to be printed by a name of the plurality of print files.

8. A printing method according to claim 6, wherein the setting file designates the plurality of print files to be printed by an order of the plurality of print files.

9. A printing method according to claim 6, wherein the setting file includes a style sheet and the plurality of print files includes HTML data.

10. A printing method comprising:
    a receiving step of receiving an electronic mail including a plurality of print files, and a message body that includes information to set a format and information to designate the plurality of print files;

a formatting step for formatting the plurality of print files in the format set by the information to set the format; and a printing step of printing the plurality of print files, designated by the information to designate the plurality of print files, in the format set by the information to set the format.

11. A computer program embodied on a computer-readable medium, the computer program comprising:

a receiving step of receiving an electronic mail including a setting file for setting a format, a plurality of print files, and a message body that includes information to designate the setting file and information to designate the plurality of print files;

a formatting step for formatting the plurality of print files in the format set by the setting file; and a printing step of printing the plurality of print files, designated by the information to designate the setting file, in the format set by the setting file.

12. A computer program according to claim 11, wherein the setting file designates the plurality of print files to be printed by a name of the plurality of print files.

13. A computer program according to claim 11, wherein the setting file designates the plurality of print files to be printed by an order of the plurality of print files.

14. A computer program according to claim 11, wherein the setting file includes a style sheet and the plurality of print files includes HTML data.

15. A computer program stored on a computer-readable medium, the computer program comprising:

a receiving step of receiving an electronic mail including a plurality of print files and a message body that includes information to set a format and information to designate the plurality of print files;

a formatting step for formatting the plurality of print files in the format set by the information to set the format; and a printing step of printing the plurality of print files, designated by the information to designate the plurality of print files, in the format set by the information to set the format.

* * * * *

UNITED STATES PATENT AND TRADEMARK OFFICE
CERTIFICATE OF CORRECTION

PATENT NO. : 7,136,180 B2 Page 1 of 1
APPLICATION NO. : 09/998230
DATED : November 14, 2006
INVENTOR(S) : Takeshi Utsunomiya It is certified that error appears in the above-identified patent and that said Letters Patent is hereby corrected as shown below:

On The Title Page, Item -56-
References Cited FOREIGN PATENT DOCUMENTS, "JP 96-077994 3/1994" should read -- JP 6-077994 3/1994 --.

COLUMN 4:
Line 38, "received data." should read -- received. --.

COLUMN 11:
Line 17, "ostcard," should read -- postcard, --.

Signed and Sealed this

Nineteenth Day of June, 2007

JON W. DUDAS
*Director of the United States Patent and Trademark Office*